United States Patent [19]
Chekroun

[11] Patent Number: 5,680,136
[45] Date of Patent: Oct. 21, 1997

[54] ELECTRICALLY ADJUSTABLE MICROWAVE REFLECTOR AND APPLICATION AS AN ELECTROMAGNETIC DECOY

[75] Inventor: Claude Chekroun, Bures sur Yvette, France

[73] Assignee: Contre Mesure Hyperfrequence CMH, Les Ulis Cedex, France

[21] Appl. No.: 611,226

[22] Filed: Apr. 26, 1984

[30] Foreign Application Priority Data

May 6, 1983 [FR] France .................. 83 07579

[51] Int. Cl.⁶ .......................................... H01Q 15/18
[52] U.S. Cl. ........................ 342/6; 342/7; 342/9; 342/11
[58] Field of Search ................. 343/18 A, 18 B, 343/18 C, 18 D, 18 E; 342/1, 2, 5, 6, 7, 13, 9, 11

[56] References Cited

U.S. PATENT DOCUMENTS 3,308,464  3/1967  Lewis ..................... 343/18 D
4,314,249  2/1982  Onoe ...................... 343/18 D
4,433,333  2/1984  Manoogian et al. ......... 343/18 E
4,686,534  8/1987  Eddy ...................... 342/165

FOREIGN PATENT DOCUMENTS 2813398  10/1979  Germany .................. 343/18 E

Primary Examiner—John B. Sotomayor
Attorney, Agent, or Firm—Pollock, Vande Sande & Priddy

[57] ABSTRACT

A microwave radar reflector includes three, substantially planar networks whose reflectivity or transmissivity may be controlled. The three networks are arranged as a trihedron with an open angle. An additional network, whose reflectivity or transmissivity may be separately controlled, is located at said open angle of the trihedron. With the additional network controlled to be transmissive and the other networks having their characteristic modulated between reflective and transmissive, the reflector will return a modulated message when the reflector is illuminated.

9 Claims, 4 Drawing Sheets

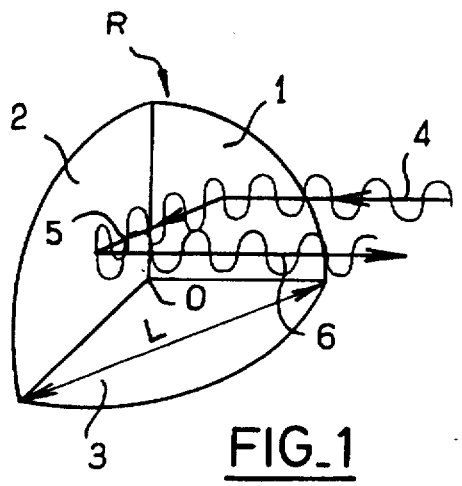
FIG_1
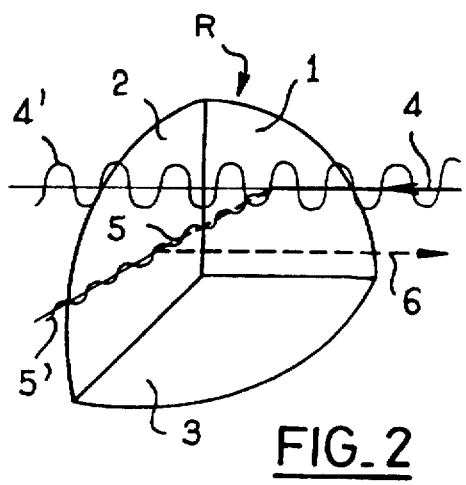
FIG_2
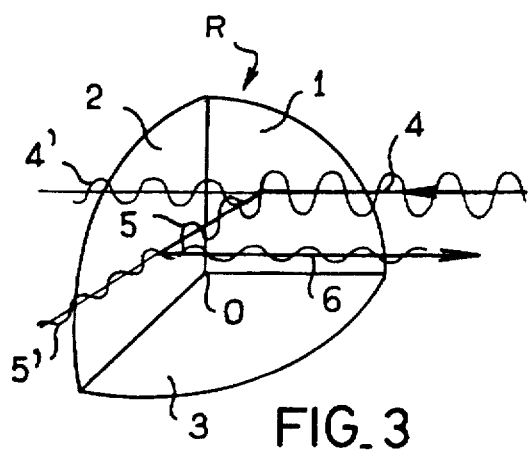
FIG_3
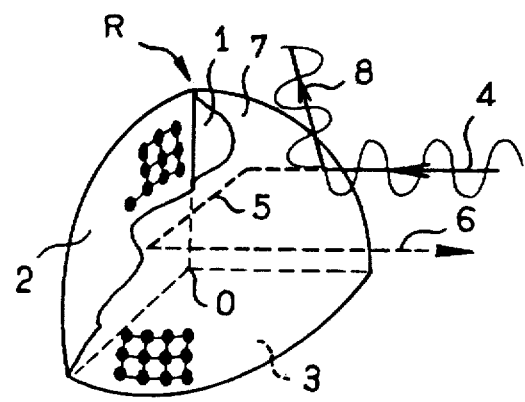
FIG_4
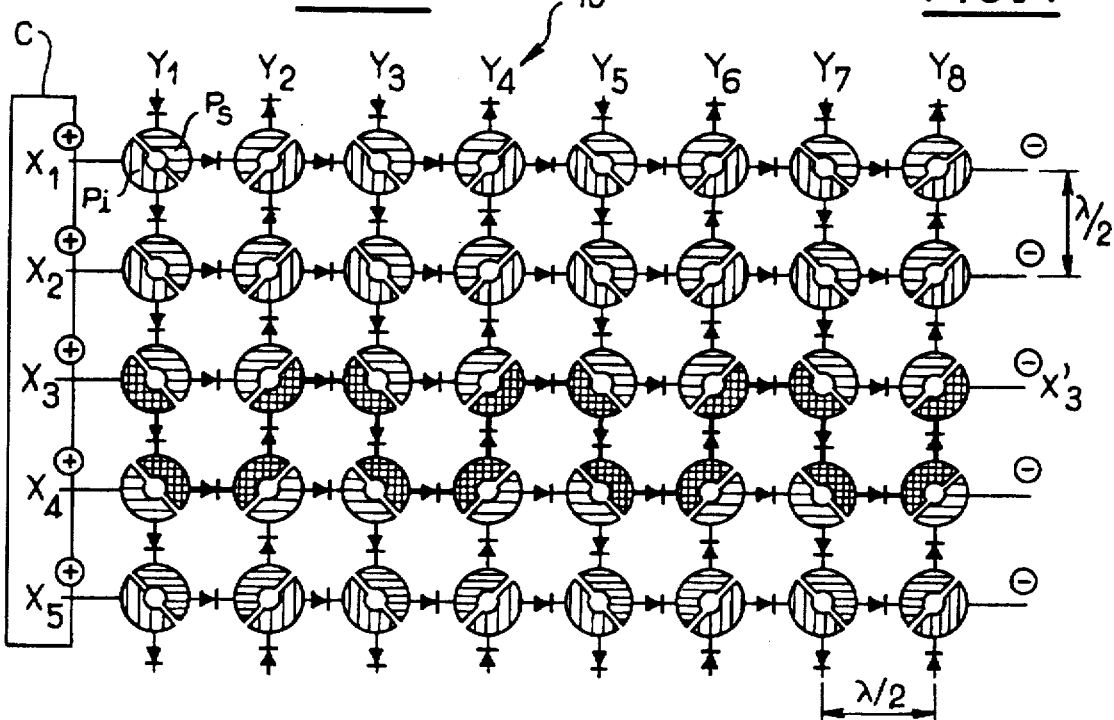
FIG_5

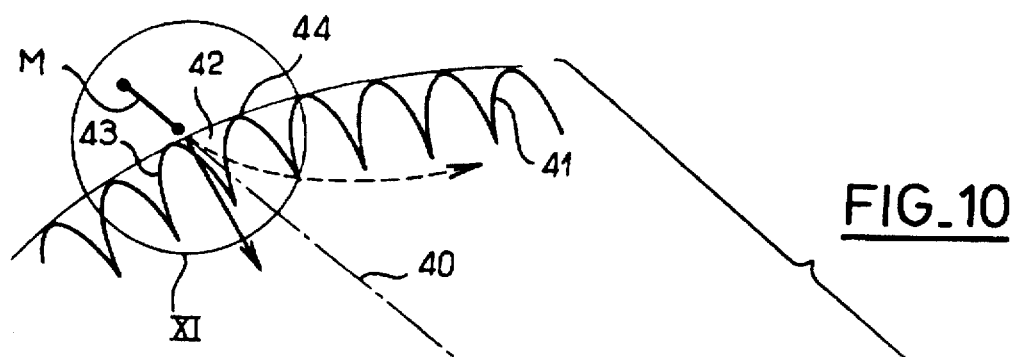
FIG_10
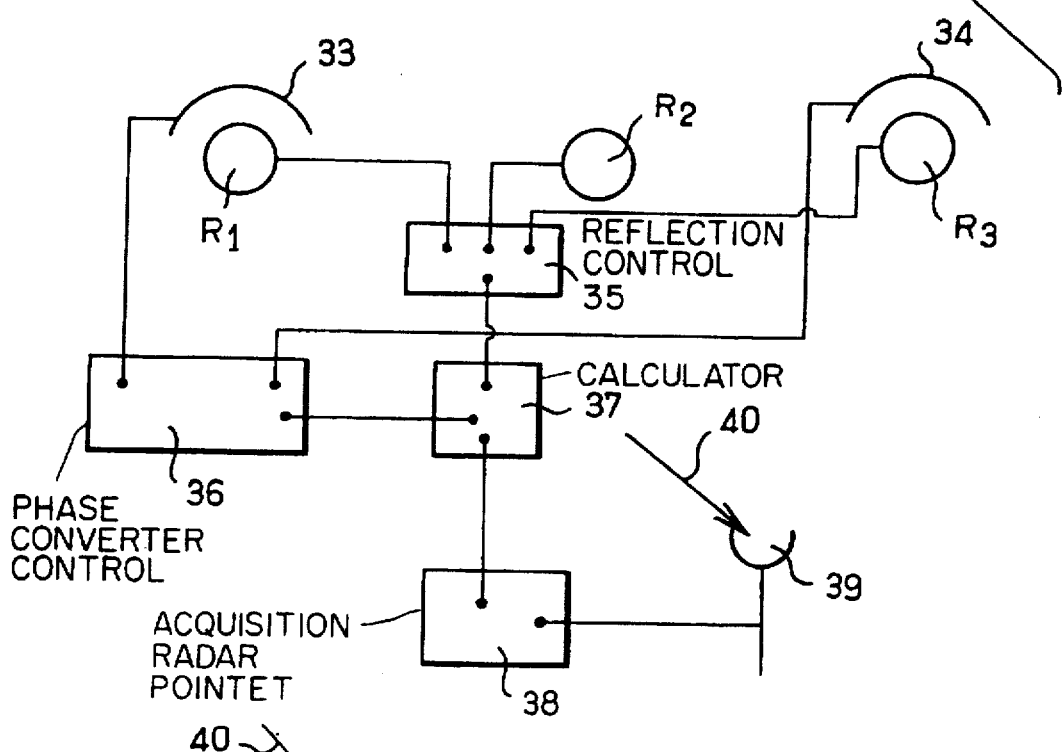
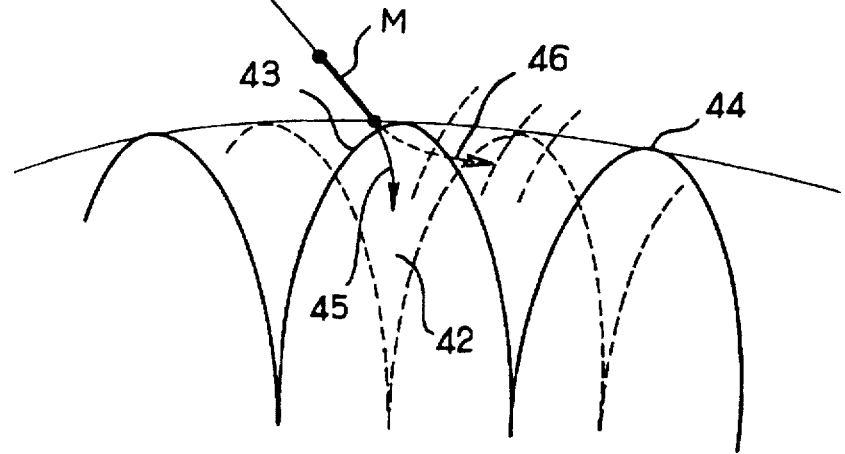
FIG_11

ELECTRICALLY ADJUSTABLE MICROWAVE REFLECTOR AND APPLICATION AS AN ELECTROMAGNETIC DECOY

FIELD OF THE INVENTION

The invention relates to controlled microwave radar reflectors.

BACKGROUND OF THE INVENTION

The prior art describes basically passive responders which are comprised of a trihedron with reflecting surfaces which can be used especially as a marker. Such responders can be compared with catadioptric systems with visual signalling.

The invention pertains to a microwave reflector with an electrically, advantageously, and gradually adjustable reflectivity, which, as a result of its actuation, can be used for many diverse applications. As is described below, the active reflector of the invention makes it possible to transmit coded signals, or data, and can be also used to create electromagnetic decoys especially for diverting radar-guided missiles for example.

SUMMARY OF THE INVENTION

A reflector according to the invention is characterized in that it is basically comprised of three, substantially planar networks with plural conductors having one or more diodes in their paths. The networks are located as a trihedron and simultaneously controlled electrically in transparency or reflection according to the desired state of response for the reflector, each network known by itself and including at least a sub-network of rows of wires or segments of conductive wires which are substantially parallel and directed according to an overall local direction X, said wires being interrupted from interval to interval by adjustable, variable, resistor elements, such as diodes. When the currents that flow in the network are more or less equal to zero the networks are reflecting; on the other hand the networks are transparent when said currents are significantly non-zero.

Advantageously, the network is comprised as a mesh or grid, i.e. each sub-network of diode connnected conductors that locally directed according to the overall direction X, we associate an equivalent sub-network of diode connected conductors that are locally directed according to a substantially orthogonal direction Y. The network becomes insensitive to the polarization direction of the impinging electromagnetic wave and it operates regardless of the direction of the electric field E in space.

According to a first application of a responder of the abovementioned general kind, we modulate the reflectivity coefficient of the three trihedron networks with a corresponding control of the currents that flow in the networks so as to reflect a modulated signal in amplitude and/or in frequency according to the applied electric control. Therefore it would seem that a reflector that is "lit" or illuminated by a microwave beam can send back in the direction of the illumination a message which is amplitude and/or frequency modulated, i.e. a message which contains the data to be transmitted. This data, obviously, can be appropriately coded, based on any conventional method, so as to be deciphered only by appropriate devices. Such a reflector also allows the forming of identification means which are both secure, economical, accurate and can be applied throughout a vast application fields, especially in civil and military aviation.

According to another characteristic of the reflector of the invention, we connect to the trihedron of the abovementioned three networks, an additional network which is identical to each of the three networks in the trihedron which covers the opening angle of the trihedron along its entire surface, this additional network being advantageously shaped with a convex curvature, for instance, generally shaped like a sphere. If we perform a transparency control on the additional network, it would seem that its presence does not alter the operation of the responder. On the other hand, if we perform a reflection control on the additional network, any microwave beam which strikes it shall be reflected in all directions in space, making the reflector somewhat "invisible". We might thus be able to "camouflage" the reflector at opportune moments if its presence should be concealed.

In an application to identification, as mentioned above, we can associate with the reflector a control that is triggered by any appropriate means. Preferably, the control is coded so that it activates a programmed modulation sequence of the reflector and performs a transparency control of the additional abovementioned network. Thus, selected devices can query the reflector from a key and receive a coded message in response, while to other devices which do not have the query key, the reflector will remain invisible.

According to another application of the reflector for implementing an electromagnetic decoys, especially for diverting missiles, we associate several reflectors, we determine the position and direction of the missile, and we control the modulation of each reflector so as to form at the missile a local phase front of which the standard deviates in relation to the direction of the target towards which the missile was heading. By locally altering the direction of the phase front of the wave that is received by the missile in response to the illuminating beam which it directs towards the reflectors, we deviate the missile from the real direction that it should be following in order to hit the target.

BRIEF DESCRIPTION OF THE DRAWINGS

The invention, its implementation and its applications will be clearer with the description that follows which is provided as a reference to the attached drawings supplied only as illustrations where:

FIGS. 1, 2 and 3 display in a schematic way a reflector according to the invention and the response which it reflects in function of the state in which it is controlled;

FIG. 4 displays as in the previous figures a reflector which is equipped with an additional control network;

FIG. 5 displays on a greater scale and schematically a part of the surface of a network which can be used to represent a reflector according to the invention;

FIG. 10 schematically displays the application of reflectors according to the invention for the forming of electromagnetic decoys;

FIG. 11 displays at a greater scale the circled detail XI in FIG. 10.

DETAILED DESCRIPTION

Figure 6:
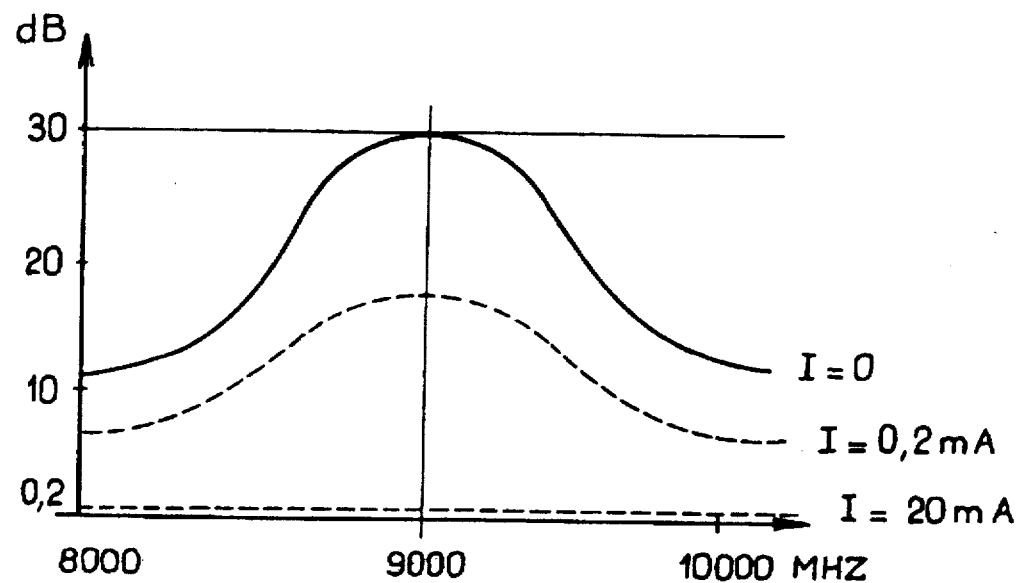
FIG. 6 displays curves which illustrate the reflectivity of the reflector according to the electric control that is applied to the networks which comprise it.

Refer to FIGS. 1, 2 and 3 which illustrate a reflector that is basically comprised of three networks of conductors having diodes connected therein. The networks are located as three planes 1, 2, and 3 to form a trihedron with an open angle that has an apex at 0. In the drawings, the trihedron is a tri-rectangle trihedron which corresponds to ⅛th of a sphere. The solid opening angle of the trihedron subtends an eighth of the solid angle $4\pi$.

In conformity with the invention, each plane 1, 2, and 3 of the reflector is a plane with a gradually adjustable reflectivity, and comprised of a network of conductors with one or more diodes connected therein, for instance of a kind that will later be described.

In state n° 1 which is illustrated in FIG. 1, each plane of the trihedron possesses a reflectivity that is more or less equal to 100%. In other words, an incident microwave beam waves 4 which falls on the reflector R for example on the reflecting plane 1 is roughly reflected with no losses to plane 2 as illustrated at 5 and returned in the direction 6 which is more or less parallel to the incident beam 4. The re-transmission signal which is comprised of the return beam 6 is strong and it is properly directed towards the transmitter, for instance an airplane radar that is interrogating the reflector R which acts as a marker.

In the state which is illustrated in FIG. 2, the planes 1, 2, and 3 of the reflector are electrically controlled so that these planes are transparent for the received microwave beam. In other words, the reflectivity of the three planes of the trihedron is more or less equal to zero. Under those circumstances, the microwave wave beam 4 which falls on the plane 1 of the reflector crosses it as illustrated in 4', without completely being reflected on the plane. The very low degree of energy that is reflected (with panels comprised as described later, is less than 1/100th of the received energy) is returned according to direction 5, and this energy nearly crosses plane 2 as shown in 5', so that the reflected beam 6 displays energy that in practice is inconsequential. In such a state, the reflector becomes "invisible" as a result of its "transparency".

In conformity with an important characteristic of the invention, the reflectivity coefficient of the planes 1, 2, 3 that comprises the reflector R, can be controlled in order to be close to 100% (in the case of FIG. 1) or to 0% (in the case of FIG. 2) and also to take on any intermediate value. In FIG. 3, we depicted an intermediate state in which we assumed that the reflectivity coefficient of each plane is about 50%. Under such circumstances, the beam 4 which falls on the plane 1 is divided into beam 4' that crosses the plane 1 and into beam 5 reflected by this same plane, both beams possessing roughly the same energy. In a similar fashion, the beam 5 is divided by falling on plane 2 of the reflector into beam 5' that is transmitted and into beam 6 which is reflected with an intensity that is roughly equal, so that the beam 6 which is reflected by the reflector at the same frequency as the transmitted beam 4 displays an amplitude that is substantially reduced by ¾ as illustrated.

We know that from the time that we have planes 1, 2, 3 with a gradually adjustable reflectivity, it is possible to modulate at will the intensity of the microwave beam 6 that are reflected from the received microwave beam 4. Furthermore, if, as is the case, according to the invention, the reflectivity change control for the planes of the reflector can be performed with a substantial degree of flexibility, it is possible to modulate the amplitude of the re-transmitted signals in order to supply any desired corresponding data.

Furthermore, in view of the typical high frequency content, it is possible to fashion a signal that is returned with frequency modulation if so desired.

In FIG. 4, we illustrate a reflector R of the same kind as the one which is described in the previous figures which includes, aside from the three variable reflectivity planes 1, 2, 3 a surface 7 that is shaped generally like a spherical dome that covers the entire open angle of the reflector. This surface 7 is comprised of a network with characteristics which are identical to those of the networks that comprise the three adjustable reflectivity planes 1, 2, 3 of the responder.

It would seem that with this additional network 7, it is possible to obtain a new adjustable reflectivity effect.

When the network 7 is electrically controlled to be transparent, the reflector behaves as if this surface did not exist. On the other hand, when the additional network 7 is controlled so that the surface 7 is reflective, an incident beam of waves 4 is reflected at the surface of the dome 7 and it is sent back outside as shown in 8, the convex curvature of the surface 7 behaving so that the transmitter, for instance the radar of an airplane which is trying to spot the reflector will receive practically no signal at all in return; the reflector being "invisible" in that state.

Now we will refer to FIG. 5 in which we illustrate a practical implementation of the network that makes it possible to form the surfaces of the planes 1, 2, 3 of the reflector and the protective dome 7.

The network which is depicted in FIG. 5, and that is indicated by 10 as a unit, is comprised of two sub-networks of conductors with diodes connected therein. The conductors are directed according to an overall direction X and according to the overall orthogonal direction Y.

We can form on one and only one side of a support plate made of plastic of an appropriate grade (not shown), using a printed circuit method, a grid of square meshes with a side measuring $\lambda/2$ ($\lambda$ being the average length of the electromagnetic wave which will be received by the reflector. Each node in the grid is a metal conductive plate which may be shaped like an annular pellet. Each pellet is sub-divided into two half-pellets which are indicated respectively as $P_S$ (upper plate which is striped horizontally) and $P_i$ (lower plate which is vertically striped) that are electrically separated or insulated from the other by an interval or a gap.

From those plates, it is possible to supply all the wire segments by gathering in twos each adjacent plate, on only one side of a support plate we supply the network 10 at one side (to the left in the figure) as indicated by the signs (+), and by returning the supply on the other side (to the right in the figure) as indicated by the signs (−); therefore we supply each segment of the grid or mesh with a diode connected thereto. In the figure, we emphasize the supply path for the constant current according to line $X_3$, $X_3'$, so as to follow it with more ease.

With such an assembly:

a) when the network is supplied with strong currents, for instance intensities equaling about 20 milliamperes, such a network is perfectly transparent with respect to the microwave energy impinging thereon;

b) when the network is not supplied with electric current, such a network behaves like a perfectly reflecting surface with regard to a beam of microwave energy with a wave length $\lambda$, the reflectivity coefficient being substantially greater than 99%;

c) if we ensure the supply of weak current to the network, or intermediate currents between an intensity equal to zero and a strong intensity (20 milliamperes should be viewed as a strong intensity), we obtain an intermediate coefficient which decreases as the current intensity which flows through the network increases. The controlled currents just referred to are supplied by the controlled source C.

We will provide below an assembly example of a meshed network which is designed to work at an average frequency of 9.000 MHZ (frequency band X).

At this frequency, we obtain a wave length λ equal to 3.3 cm, or a mesh width of λ/2 close to 1.7 cm. The diodes used are of the PIN 5082-3080 type which display a total capacitance of 0.21 pF at about 50 volts and a breakdown voltage which is greater than 350 volts for a current of 10 microamperes.

A network conceived as such displays a reflectivity coefficient which varies basically according to the intensity of the current which flows through the meshes of the network and in an ancillary way in relation to the frequency of the received wave. FIG. 6 accurately expresses the corresponding results.

FIG. 6 illustrates the signal loss in decibels at the ordinate of such a network as a function of the frequency at the abscissa, and for isocurrent curves.

The curve i=0 illustrates that at the 9000 MHZ frequency, the transmission loss of the signal when it crosses the network is about 30 dB. This means that only 1% of the signal crosses the network, 99% of the signal being reflected. In the vicinity of frequencies 8000 and 10,000 Hertz, we see that the transmission loss occasioned by crossing the network is about 12 dB, which means that at least 99% of the power in the signal freely crosses the network, and less than 1% is reflected.

An intermediate curve which is traced for current intensity i=0.2 milliamperes, shows that for such a current intensity, the reflectivity coefficient around the 9000 MHZ frequency is about 90%.

In FIG. 6, we did not trace any other curve to avoid obscuring the figure, but all the intermediate values can be obtained by gradually varying the current which flows through the network meshes.

In an application where the reflector displays an opening width L as shown in FIG. 1 which is about 17 cm, the reflector has a surface that equals 10 m$^2$ at a current flow of zero, and reduced to 2 m$^2$ for a current flow of 2 milliamperes and reduced to 0.1 m$^2$ for a current flow of 20 milliamperes, those values being provided only as examples and depending on assembly parameters for the network and the diodes being used.

At this level of the description, it is important to note that experience shows that the results are not drastically changed in the face of significant variations of incidence, relative to the reflecting plane of the network of the direction in space for $\vec{E}$ and $\vec{H}$ vectors of the incident wave.

We observe that with the form of the network as described in connection with FIG. 5, it is not difficult to shape the network according to any desired surface, and for instance to give it a spherical dome shape in order to form a network as shown by 7 in FIG. 4.

Figure 7:
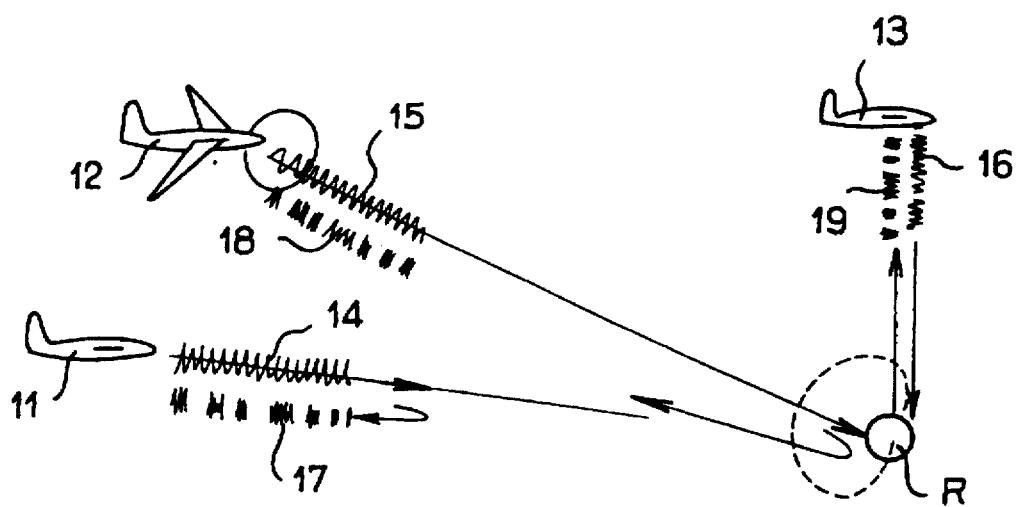
FIG. 7 displays schematically an application example of the reflector used as an identification marker.

We will now refer to FIG. 7 to illustrate a use of the reflector of the invention.

In this figure, we show a reflector R towards which or in the vicinity of which airplanes 11, 12, 13 approach. Each airplane sends a continuous signal towards the responder as shown in 14, 15, 16 for instance in the X (9000 MHZ) frequency band.

If the reflector is controlled so that modulated currents cross its three networks 1, 2, 3, the signals that are reflected towards each transmitting plane will be modulated in correspondence (and identically) as diagrammed in 17, 18, 19. The modulated signals transmit a message to the interrogating airplanes, for instance a marker identification. If the marker modulation takes place as all or nothing (reflectivity which is more or less total or equal to zero), the reflected signal is also modulated as all or nothing, and it is received in the shape of a striped train of waves. If the networks with adjustable reflectivity are modulated in a gradual way, it is possible to send back a frequency modulated signal, which can be enhanced and of better quality.

We note that the reflector R can be comprised of several juxtaposed trihedras which form as many eighths of spheres which are juxtaposed as are necessary, so as to be directed in all useful directions in space.

Figure 8:
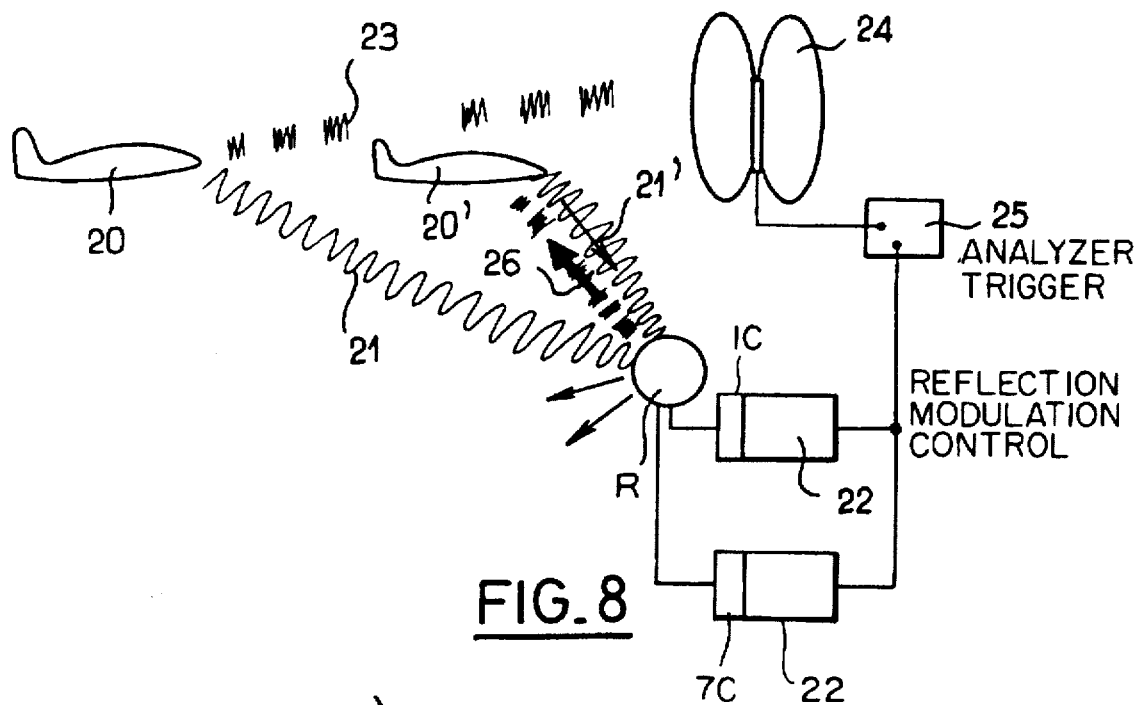
FIG. 8 depicts as in FIG. 7 a control variation of the markers.

According to the application which is illustrated in FIG. 8, an airplane 20 sends a signal 21 towards the reflector R which might sense the presence of the reflector. The reflector R includes the networks 1, 2, and 3 (of FIG. 4) driven by a controlled source 1C, which may be identical to the source C of FIG. 5. The reflector R also includes the network 7 (of FIG. 4) driven by a controlled source 7C, which may be identical to the source C of FIG. 5.

Assume that the reflector is equipped with an additional network as 7 which is illustrated in FIG. 4, we can control the reflectivity of the network 7. In this case the signal 21 which is sent by the airplane 20 is reflected in all directions in space, thus the reflector R remains invisible to the radar from the airplane 20. In order to allow the plane 20 to interrogate the reflector R, in this case, we associate the responder R and control 22 (for the control of source 1C and its networks 1-3) and a control 122 (for the control of source 7C and its network 7). The controls 22 and 122 are triggered by any appropriate means, for instance by sending a coded signal 23 received by an antenna 24 of the omni-directional kind which operates for instance in the L Band (1000 MHZ). The antenna 24 transmits the coded signal 23 to an analyzer 25 which triggers the control 22 and control 122 of the reflector. At that point, the reflector is controlled so the network 7 becomes transparent and the three other networks 1, 2, 3 of the reflector are modulation controlled so that in response to the signal 21' sent by the airplane (at position 20'), the coded information 26 is returned. In this way, we ensure highly improved and very select discretion in the information that is transmitted by the reflector. Such an identification system for instance can be used to distinguish the friendly planes from others, in a fleet of airplanes.

We should note that, when the meshed networks 1, 2, 3 of the reflectors are not supplied, all those networks are reflective. In order for the reflector to be invisible in such a state, it is quite useful to use the additional network like 7 which makes it possible to camouflage the reflector without any current expenditure. Only in the active phase of the reflector do we consume current to make the protective network 7 transparent and to modulate in the desired way the other networks of the trihedron for the responder.

Figure 9:
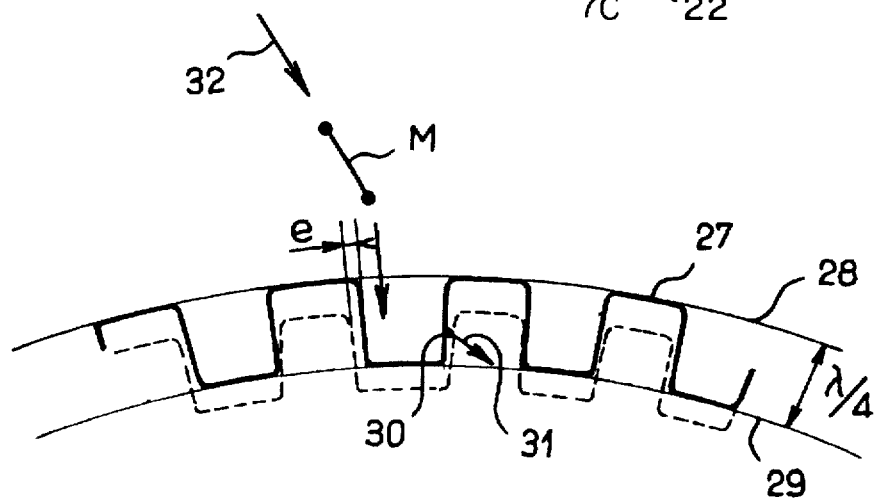
FIG. 9 is a diagram which illustrates the dissemination of the phase front of the re-transmission signals for two markers.

We will now refer to FIGS. 9, 10, and 11 in which we illustrated an application of reflector of the invention to implementing electromagnetic decoys.

We will first refer to FIG. 9 in which we schematically indicated how the phase front of two reflectors $R_1$, $R_2$, is formed, which receive the same microwave beam from a missile M for instance. In this figure, we assume that the equivalent radar surfaces (S.E.R.) were equal; in other words, the two reflectors $R_1$, $R_2$ are assumed to be built for instance identically and controlled in the same states.

The equi-phase surfaces move as in 27 by advancing and the surfaces can be traced in the shape of gear cogs between two spheres 28, 29 which are separated from one another by a fourth of a wave length of the considered beam. We observe that the width of discontinuities e at the level of the phase curves is reduced, so that practically speaking, the missile M which is perpendicular in its direction towards the phase front, or to spheres 28, 29, will head towards the reflectors $R_1$, $R_2$. However, when the missile, locally, reaches a point like 30, at the level of a discontinuity, it might adopt a perpendicular direction to the front of that discontinuity and to deviate in relation to its route as shown by arrow 31. The arrow 32 illustrates the path followed by the missile M.

In conformance with the invention, we will enhance the discontinuities of the phase front by increasing them and moving them in order to make the missile deviate from its course. But, we realize that if we gradually vary, the equivalent radar surface of one of the reflectors $R_1$ in relation to the other, we decrease the discontinuities and we distort and move the phase front.

Practically speaking, in order to obtain greater flexibility in action, we should use at least three reflectors instead of two and associate phase converters with one or two reflectors.

A practical application is illustrated in FIG. 10.

The set-up includes three associated reflectors $R_1$, $R_2$, $R_3$. We associate with the reflectors $R_1$, $R_3$ phase converters which make it possible to obtain phase conversions from 0° to 180°. These phase converters are shown at 33, 34. The three reflectors $R_1$, $R_2$, $R_3$ are connected to a device 35 which makes it possible to control and pilot the variable reflectivity of each one of the three reflectors, according to a set program, each reflector being controlled independently but relative to the other two. At 36, we showed the control for the phase converters 33 and 34 which makes it possible to separately control in relation to one another the two phase converters 33, 34 (in phase control 0° or 180°). The control for the reflectors 35 and the control for the phase converters 36 are connected to a calculator 37 which controls them according to information which it receives from a pointer 38 that is connected to an acquisition radar 39 which assesses the arrival direction 40 at each moment of the missile M and its distance.

According to the direction and position of the missile M, the calculator 37 ensures with the means described above the shift and distortion of the phase front that is shown in 41, so that the missile nose, or its radar is located in the discontinuous area 42 which is located between two peaks 43, 44 of an equi-phase surface.

More accurately, by referring to FIG. 11, if at a given moment, the phase front which is formed by the three reflectors $R_1$, $R_2$, $R_3$ in their set reflectivity and phase converting states displays the shape that is illustrated with full lines; the missile M in the vicinity of the peak of an undulation, tends to head according to arrow 45 in a perpendicular direction to the phase front towards the reflectors. We slightly alter the control by adjusting the reflectivities of the reflectors in order to shift the phase front as shown in dotted lines. The missile is in the discontinuous region 42 of the phase front and it tends to head in a perpendicular direction to this discontinuity; thus being deviated as shown by arrow 46.

Programming for the decoy control can be performed in several ways, for instance in the following way.

We can predetermine, for any direction in space and for any distance, corresponding states for the controls by placing the considered point in space within the discontinuous region which is most appropriate. This programming is stored in a memory for later recall at the appropriate time.

Another method involves the empirical determination of the best modulation which makes it possible to gradually alter the phase front by forming the widest discontinuities in a given region. Afterwards, when a missile appears in the determined region, we control the reflectors in the usually set way, and we exert a gradual change and monitoring of the parameters of the control until we observe and preserve a desired deviation angle for the missile.

Another method which makes it possible to deviate the missile involves the association of several reflectors, and at least two which are sufficiently distant from one another. Then, we change alternately the reflectivity of one or several associated reflectors according to a preset scheme where the duration is greater than the response time of the guidance missile system. Therefore, the missile will head now to one reflector, then to another and thereafter to an intermediate. By capitalizing on the kinetic energy of the missile, we can make the latter deviate from any useful trajectory.

We should note that we can associate several superimposed reflectors that operate optimally inside different frequency bands so as to expand the activity spectrum of the reflectors. In this way, we are assured of a nearly perfect degree of "invisibility" for the entire reflector if each one includes the additional network 7 which is described above and when the reflectivity state, obviously, is controlled for the networks 7.

I claim:

1. A microwave radar reflector electrically, continuously adjustable between substantially reflective and substantially transmissive states comprising:

at least three, substantially planar, networks arranged as a trihedron subtending an open angle, each said network comprised of a plurality of conductors each with at least one variable resistance element connected therein, conductors in any one network oriented substantially parallel other conductors in said one network, current control means for subjecting said networks to a controlled current level for adjusting resistance of said variable resistance elements to that said networks present a controlled transmissivity or reflectivity to impinging electromagnetic energy, said networks presenting substantial reflectivity when said current level is substantially zero and substantial transmissivity when said current level is significantly different from zero, an additional network located in said open angle, said additional network comprised of a plurality of additional conductors each with at least one additional variable resistance element connected therein, additional conductors in said additional network oriented substantially parallel other additional conductors in said additional network, additional current control means for subjecting said additional network to a controlled current level for adjusting resistance of said additional variable resistance elements so that said additional network presents controlled transmissivity or reflectivity to impinging electromagnetic energy, said additional network presenting substantial reflectivity when said current level is substantially zero and substantial transmissivity when said current level is significantly different from zero, whereby, by adjusting said current and additional current control means said radar reflector may present a substantially transmissive, substantially reflective or variably reflective characteristic.

2. A microwave radar reflector as recited in claim 1 wherein said additional network has a convex curvature in a part spherical form.

3. A microwave radar reflector as recited in claim 2 in which said networks have a mesh format with conductors located on intersecting paths, a plurality of nodes, each node at a different intersection of a pair of paths, said nodes including two electrically insulated pellets, each pellet connecting a different pair of conductors whose paths intersect at said node.

4. A microwave radar reflector as recited in claim 3 wherein a pair of said pellets at a single node are ring shaped, each pellet comprising one of two symmetrical half rings, said half rings insulated from each other.

5. A microwave radar reflector as recited in claim 1 which further includes means to modulate said controlled current level, coupled to said current control means, so that said networks present an amplitude or frequency modulated reflectivity, whereby when illuminated said networks transmit an amplitude or frequency modulated signal.

6. A controlled microwave radar reflector as recited in claim 1 which further comprises:

transmission means responsive to interception of a particular transmission for triggering a response means, and response means triggered by said transmission means for modulating a current level impressed by said current control means on said networks in a programmed fashion so that said controlled microwave radar reflector returns a programmed signal when illuminated and triggered.

7. A controlled microwave radar reflector as recited in claim 6 further comprising:

additional response means triggered by said transmission means for controlling said additional current control means to impress a substantial current level on said additional network so that additional network presents a substantially transmissive characteristic.

8. An electromagnetic decoy comprising a plurality of microwave radar reflectors as recited in claim 1, at least one of said microwave radar reflectors separated from another of said reflectors and further comprising:

first means for detecting a location of a transmitting body to be subjected to misdirection by said decoy, master means, responsive to said first means, for controlling said current control means and said additional current control means of each of said microwave radar reflectors to create, at said location, a local phase front which is different from a direction in which said transmitting body was travelling at a time when said first means detected said transmitting body at said location.

9. An electromagnetic decoy as recited in claim 8 wherein at least one of said microwave radar reflectors further includes adjustable phase converting panel means for phase shifting an electromagnetic wave by zero or one hundred eighty degrees.

* * * * *